United States Patent Office 3,303,193
Patented Feb. 7, 1967

3,303,193
DERIVATIVES OF CEPHALOSPORANIC ACID
John C. Godfrey, Syracuse, N.Y., assignor to Bristol-Myers Company, New York, N.Y., a corporation of Delaware
No Drawing. Filed Nov. 24, 1965, Ser. No. 509,627
5 Claims. (Cl. 260—243)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive, and Gram-negative bacteria and, more particularly, relates to an acid and its nontoxic, pharmaceutically acceptable salts, said acid being 7-(2,2-dimethyl-5-oxo-4-phenyl-1 - imidazolidinyl) - 3 - acetoxymethyl-8-oxo-5-thia-1-azabicyclo-[4.2.0]oct - 2 - ene-2-oic acid, which has the structural formula

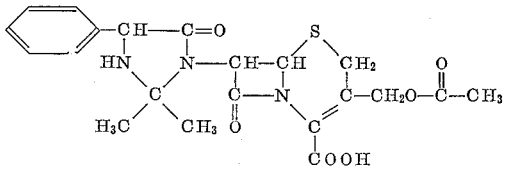

has been given the trivial name hetasporin and may also be named 7-(2,2-dimethyl-5-oxo-4-phenyl-1-imidazolidinyl)cephalosporanic acid.

The preparation of the compound commonly called cephaloglycin or 7-(D-α-aminophenylacetamido)cephalosporanic acid has been described in British Patent 985,747 and in South African patent application 63/3008. This compound exhibits high activity in vitro against both Gram-positive and Gram-negative bacteria but suffers from the severe drawback of decomposing rapidly in aqueous solutions, as indicated by footnote 9 of Chauvette et al., J. Amer. Chem. Soc. 84, 3401–3402 (1962) and by Wick and Boniece, Applied Microbiology 13(2), 248–253 (March, 1965). It was the object of the present invention to convert cephaloglycin to a new chemical compound which would be highly stable in aqueous solution and yet also be nontoxic and exhibit good oral absorption and high antibacterial activity against both Gram-positive and Gram-negative bacteria.

The object of the present invention has been achieved by the provision, according to the present invention, of the compound of the formula

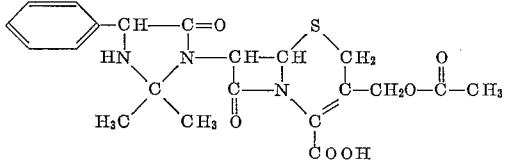

and its nontoxic, pharmaceutically acceptable salts.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri(lower)alkylamines, procaine, dibenzylamine, N - benzyl-beta-phenethylamine, 1 - ephenamine, N,N'-dibenzylethylenediamine, dehydroabietylamine, N,N' - bis-dehydroabietylethylenediamine, N - (lower)alkylpiperidines, such as N-ethylpiperidine and other amines which have been used to form salts of benzylpenicillin; and (2) nontoxic pharmaceutically acceptable acid addition salts (i.e. salts of the basic nitrogen) such as (a) the mineral acid addition salts such as the hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate, p-toluenesulfonate and the like. Also included are the easily hydrolyzed esters or amides of such acids which may be converted to the free acid form by chemical or enzymatic hydrolysis.

The carbon bearing the free amino group of cephaloglycin is an asymmetric carbon atom and thus cephaloglycin and also hetasporin can exist in two optically active, isomeric forms (the D- and L-diastereoisomers) as well as in a mixture of the two optically active forms, all of which are included in the present invention.

The hetasporin of the present invention is prepared by the reaction of acetone with cephaloglycin. Although some reaction will occur no matter what molar proportion of reactants is used, it is preferable in order to obtain maximum yields to use a molar excess of the acetone and the latter may well be used as the reaction solvent. Water is split off during the reaction and it is thus preferable not to have a major amount of water in the reaction medium. The pH of the reaction mixture should be from about 5 to 9 and preferably on the alkaline side. The pH may be adjusted to within this range, if necessary, by the addition of an alkaline material such as, for example, sodium hydroxide, sodium carbonate, potassium hydroxide, potassium carbonate, ammonium hydroxide, ammonium carbonate, organic amines (e.g. triethylamine), etc.

The temperature during the reaction is not critical. The reaction will proceed satisfactorily at room temperature and may be hastened by heating.

Thus the present invention includes the process of preparing the compound of the formula

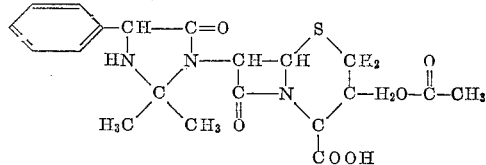

which comprises mixing cephaloglycin with at least an equimolar weight of acetone in the absence of substantial amounts of water at a pH in the range of 5 to 9 and at a temperature in the range of −20° C. to +50° C.

The following example illustrates the best mode contemplated for carrying out this invention but it is not limited thereto.

EXAMPLE 8

7-[D(−) - N - carbobenzoxy - 2 - phenylglycyl]cephalosporanic acid.—The mixed anhydride of N-carbobenzoxy-D(−)-2-phenylglycine was prepared by dissolving 6.00 g. (21.0 millimoles) of the latter compound in 100 ml. of dry tetrahydrofuran, adding 2.96 ml. dry triethylamine (21.0 millimoles), cooling to −5° C., adding 2.00 ml.

ethyl chloroformate (21.0 millimoles), and stirring at −5° C. for 10 minutes. To the resulting slurry was added a solution prepared as follows: 5.72 g. (21.0 millimoles) of 7-aminocephalosporanic acid was suspended in 50 ml. water and 1.5 ml. triethylamine was added, followed by 50 ml. tetrahydrofuran and more triethylamine dropwise until the pH of the solution reached 7.1 and only a small amount of the starting acid remained undissolved; the solution was then cooled to 3° C. The reaction mixture was stirred at −5° C. for one-half hour and then allowed to warm to +20° C. during one hour. It was diluted with 350 ml. water and 110 ml. wet tetrahydrofuran was distilled from it at 35 C.° on a rotary evaporator. The resulting gelatinous mixture was found to have a pH of 6.0. It was shaken with 500 ml. ethyl acetate to give a stable emulsion, and then acidified to pH 2 with 10 ml. of 42% phosphoric acid. The product was quickly extracted into the ethyl acetate, the layers separated, and the aqueous phase washed twice more with 350 ml. portions of ethyl acetate. The combined ethyl acetate extracts were washed once with 300 ml. saturated sodium chloride, twice with 300 ml. portions water, dried briefly over sodium sulfate, filtered and evaporated to dryness at 35° C. The semi-crystalline residue was washed onto a filter with 200 ml. of dry ether, dried, screened through a 40-mesh screen and rewashed with 200 ml. of dry ether to give 6.05 g. (53.4%) of 7-[D(−)-N-carbobenzoxy-2-phenylglycyl]cephalosporanic acid as white, crystalline powder, M.P. 143–145° C. Its infrared spectrum in KBr was characterized by the following absorption bands: 3.02, NH; 5.60 to 5.66, β-lactam; 5.72 to 5.85, ester, urethane and free acid carbonyls; 6.01, amide; 6.6, amide II; 8.0 to 8.2 microns, urethane and ester C-O-C; 14.4, monosubstituted phenyl.

*7-[D(−)-2-phenylglycyl]cephalosporanic acid.*—In a 500 ml. pressure bottle 1.50 g. of 7-[D(−)-N-carbobenzoxy-2-phenylglycyl]cephalosporanic acid was dissolved in 15 ml. dioxane, followed by 7.5 ml. water, 4.5 ml. saturated sodium bicarbonate and 71 ml. water in that order, care being taken at each addition to agitate vigorously so that the starting material remained in solution. The bottle was flushed with nitrogen, and 1.50 g. of 30% palladium on diatomaceous earth was added. The bottle was purged with hydrogen and filled to a pressure of 49.0 p.s.i.g. Shaking was started, and the pressure in the bottle was observed to fall rapidly to 42.5 p.s.i.g. during ca. 2.5 minutes, and no further decrease in pressure was noted during the total reduction time of 5.00 minutes. The solution was immediately acidified to pH 2.0 with 6 N hydrochloric acid and filtered to remove the catalyst, which was washed with a few ml. of acidified water. The filtrate was neutralized to pH 3.65 with saturated sodium bicarbonate solution and evaporated to dryness at 35° C. on a rotary evaporator. The crude product, 7-[D(−)-2-phenylglycyl]cephalosporanic acid (also called cephaloglycin), weighed 1.02 g. and was shown to contain 45% by weight of sodium chloride. The yield of desired product was therefore 0.57 g. or 51%. Its infrared spectrum (KBr) had the following characteristic bands: 3.00 to 3.15, NH and NH₂; 5.69 to 5.77, β-lactam and ester; 5.97, amide carbonyl; 6.25 to 6.4, phenyl and carboxylate; 6.5, amide II; 14.4 microns, monosubstituted phenyl.

*7-(2,2-dimethyl-5-oxo-4-phenyl-1-imidazolidinyl)-3-acetoxymethyl-8-oxo-5-thia-1-azabicyclo-[4.2.0]oct-2-ene-2-oic acid, triethylamine salt.*—A mixture of 3.92 g. of 7-[D(−)-2-phenylglycyl]cephalosporanic acid (containing 50% sodium chloride) and 0.69 ml. dry triethylamine in 69 ml. anhydrous acetone was stoppered and stirred at 25° C. for 14.5 hours. The insoluble sodium chloride was removed by filtration and solvent was removed from the clear, light brown filtrate on a rotary evaporator at 35° C. The residue was evaporated again with about 50 ml. dry ethyl acetate and rinsed from the flask with 200 ml. dry ether. The slightly hygroscopic, crystalline product (triethylamine salt of hetasporin) weighed 2.40 g. (90.5% yield). An attempt to determine the melting point showed that it gradually decomposes at any temperature above 100° C. Its infrared spectrum (KBr) had intense bands at 2.95 (NH), 3,66, 3.75 and 4.02 (triethylammonium), 5.67 (β-lactam), 5.78 (ester), 5.86 and 5.91 (imidazolidinone), 6.26 (carboxylate), and 7.12 microns (ester).

*Analysis.*—Calc'd for $C_{27}H_{38}N_4O_6S \cdot H_2O$: C, 57.42; H, 7.14; N, 9.92. Found: C, 57.34; H, 7.98; N, 9.85.

*7-(2,2-dimethyl-5-oxo-4-phenyl-1-imidazolidinyl)-3-acetoxymethyl-8-oxo-5-thia-1-azabicyclo-[4.2.0]oct-2-ene-2-oic acid.*—The triethylamine salt of hetasporin, 2.40 g., was dissolved in 110 ml. water, filtered, layered with 110 ml. ethyl acetate, and acidified to pH 2 with 42% phosphoric acid. The free acid was quickly extracted into the solvent, and the aqueous layer was extracted twice more with 60 ml. portions of ethyl acetate. The combined extracts were washed once with 50 ml. of saturated sodium chloride and twice with 40 ml. portions of water. The solution was dried briefly over sodium sulfate, filtered, and evaporated to about 3 ml. at 35° C. on a rotary evaporator. The concentrated solution was diluted with light petroleum, B.P. 60–70° C., and the solid product, hetasporin, was isolated by filtration, 450 mg. (23.4% yield). Its infrared spectrum (KBr) had the following bands: 2.94 (NH and H₂O), 3.35 and 3.40 (aliphatic CH), 4.0 (acid hydroxyl), 5.62 (β-lactam), and a broad band centered at 5.75 microns (includes carbonyls of free acid, ester, and imidazolidinone). The infrared spectrum showed the total absence of an amide II band near 6.5 microns. The NMR spectrum of this product in D₂O revealed only the expected protons: 7.4 p.p.m., aromatic H; 5.8 p.p.m., NH, H₂O, and acid OH; 3.0 p.p.m., β-lactam H; 4.75 p.p.m., =C—CH₂—O; 5.0 p.p.m., N—C$\underline{H}$(C₆H₅)C=O; 3.4 p.p.m., S—CH₂—; 2.0 p.p.m., CH₃C=O; 1.4 p.p.m., (CH₃)₂C.

*Analysis.*—Calc'd for $C_{21}H_{23}N_3O_6S \cdot \tfrac{1}{2}H_2O$: C, 55.49; H, 5.32; N, 9.24; H₂O, 1.98. Found: C, 55.37; H, 5.37; N, 8.95; H₂O, 2.44.

The hetasporin prepared above exhibited in vitro Minimum Inhibitory Concentrations versus *S. aureus* Smith of about 1.0 mcg./ml., versus the benzylpencillin-resistant *S. aureus* Bx–1633–2 of about 6.2 mcg./ml., versus *S. enteritidis* of about 3.1 mcg./ml., versus *S. typhosa* of about 6.2 mcg./ml. and versus *Shig. sonnei* of about 3.1 mcg./ml. and, upon intramuscular injection (i.m.) or oral administration (p.o.) to mice exhibited CD₅₀'s of about 5.2 mgm./kg. i.m. and 6.8 mgm./kg. p.o. versus *Staph. aureus* Smith, of about 45 mgm./kg. i.m. and about 26 mgm./kg. p.o. versus *S. aureus* Bx–1633–2 and of about 38 mgm./kg. p.o. versus *S. enteritidis*.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. The compound of the formula

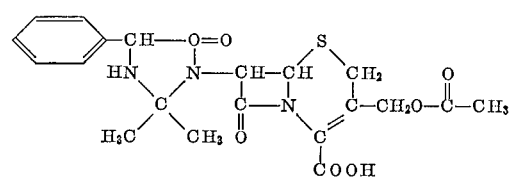

and its nontoxic, pharmaceutically acceptable salts.

2. The compound of the formula

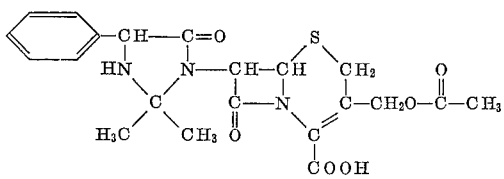

3. The sodium salt of the compound of claim 2.
4. The potassium salt of the compound of claim 2.
5. The triethylamine salt of the compound of claim 2.

References Cited by the Applicant
UNITED STATES PATENTS

| | | |
|---|---|---|
| 2,985,648 | 5/1961 | Doyle et al. |
| 3,198,804 | 8/1965 | Johnson et al. |

FOREIGN PATENTS

| | | |
|---|---|---|
| 985,747 | 3/1965 | Great Britain. |
| 63/3008 | 7/1963 | South Africa. |

OTHER REFERENCES

Chauvette et al.: J. Amer. Chem. Soc., 84, 3401–2 (1962).

Wick and Boniece: Appl. Microb., 13(2), 248–53 (March 1965).

NICHOLAS S. RIZZO, *Primary Examiner.*